March 12, 1935.   R. DAUB   1,993,875
VALVE GEAR OPERATING MECHANISM
Filed July 7, 1931
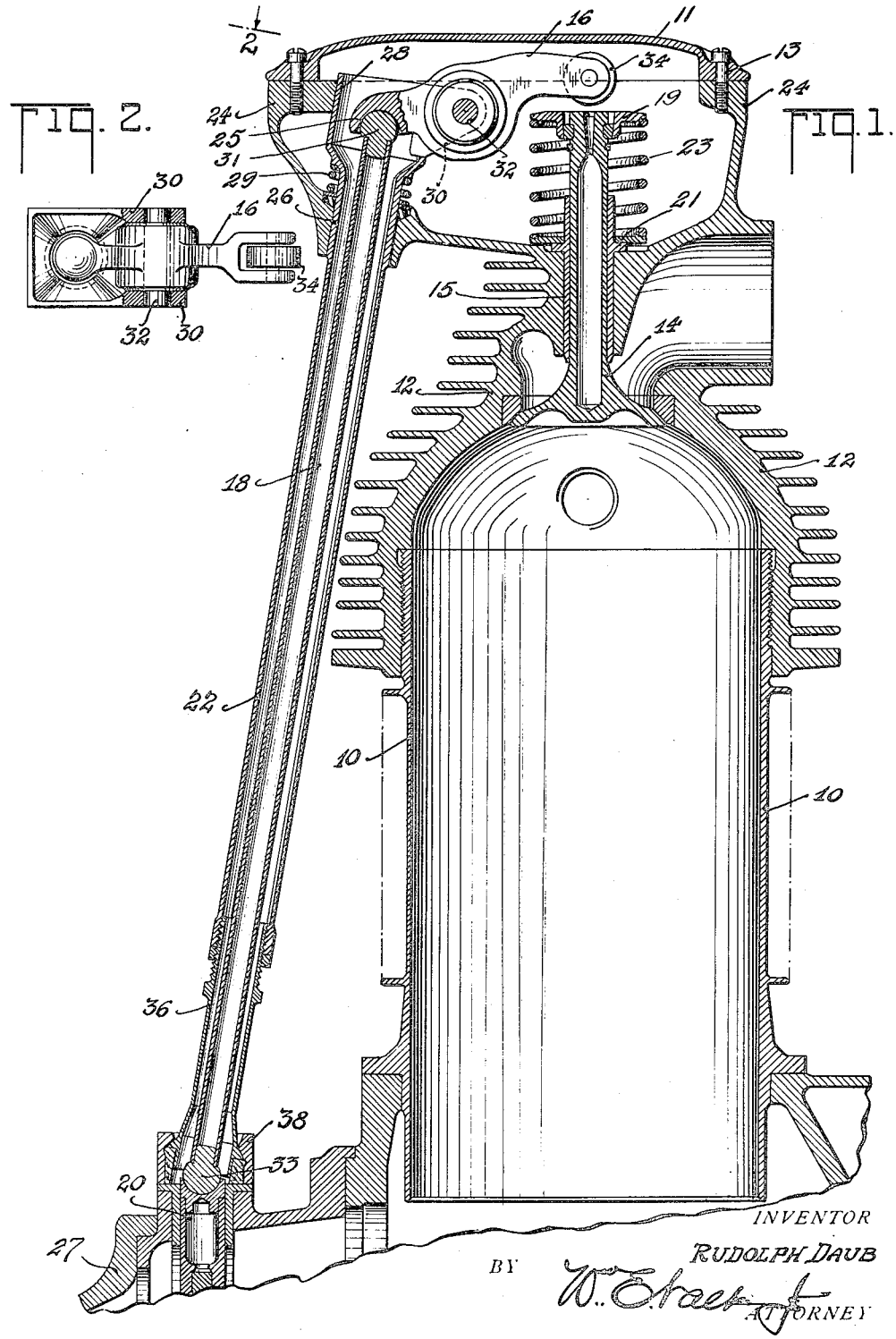
INVENTOR
RUDOLPH DAUB Patented Mar. 12, 1935

1,993,875

UNITED STATES PATENT OFFICE 1,993,875

VALVE GEAR OPERATING MECHANISM

Rudolph Daub, Nutley, N. J., assignor, by mesne assignments, to The Reed Propeller Co., Inc., Garden City, N. Y., a corporation of New York Application July 7, 1931, Serial No. 549,214

7 Claims. (Cl. 123—90)

The present invention relates to valve gears in general and more particularly to an improved type of compensation for push rod valve gears such as are used on radial aircraft engines.

In such engines the valves are usually operated from a cam concentric with the crankshaft which necessitates the use of relatively long push rods resulting in a very great variation in clearance due to the differential expansion of parts at the various operating temperatures. In large engines a clearance variation of .060 of an inch is common. This change in clearance varies the valve timing to a considerable extent, increased clearances causing the valve to open later and seat earlier.

For best maximum power a considerable overlap whereby the inlet valve opens before the exhaust valve shuts is desirable, but such overlap seriously interferes with good idling. Unfortunately the clearance in conventional valve gears is least when the engine is idling when the temperatures are minimum and greatest at full output whereat maximum temperatures and cylinder expansion occur. This gives more overlap at idling than at full throttle which is just opposite to the desired condition.

The most desirable condition for valve timing, which has not thus far been met, is to have a maximum valve clearance when the engine is cold and a minimum normal working clearance when the engine is hot. When the engine is cold, then, the valves are caused to open late and close early to thereby eliminate overlapping of the openings of the exhaust and intake valves. As mentioned above, this condition would be undesirable for full power operation but is most desirable for idling and starting. When the engine becomes hot, the valves would reach their normal working clearance and the desirable valve overlap for high performance operation would be attained.

One of the principal objects of the present invention accordingly is to provide a valve gear such that the effect of expansion on the clearance shall be to give a maximum clearance at idling speed of the engine and minimum clearance at full power of the engine.

Another object of the present invention is to provide a housing for the push rod and also to provide means for pivotally mounting the rocker arm on said housing.

A further object of the present invention is to provide means for longitudinally adjusting the push rod housing whereby the position of the fulcrum of the rocker arm in relation to the crankcase may be varied.

A still further object of the present invention is to provide means for mounting the fulcrum of the rocker arm on the engine whereby the position of the fulcrum will not be affected by the expansion and contraction of the engine cylinder.

Further objects will be apparent from a reading of the subjoined specification and claims and from a consideration of the accompanying drawing.

In the drawing:

Fig. 1 is a transverse section through a cylinder valve and push rod of a radial engine; and Fig. 2 is a partial plan view of the rocker arm.

Referring more particularly to the drawing, in which similar parts are given the same reference characters in all views, a conventional cylinder barrel is shown at 10 and is provided with a cylinder head 12 which is screwed to the barrel 10 in the usual manner.

A rocker box 24 is mounted on the cylinder head 12, being formed integral with said head 12 or secured thereto in any suitable manner. The rocker box is provided with a removable cover 11 secured in place by any appropriate fastening means, as by the threaded bolts 13.

In the cylinder head 12 is fitted a conventional valve 14, the stem of which is engaged in a bushing 15 carried by the cylinder head casting. The valve 14 is provided with a conventional valve tip 19 and the bushing 15 has a circumferential flange 21 resting on the bottom of the rocker box 24. A coil spring 23 is confined between said valve tip 19 and the flange 21 and acts to close the valve 14 and normally maintain the valve in closed position.

Extending downwardly through the bottom of the rocker box 24 and outside of the cylinder barrel 10 is a tubular housing 22 having a slip joint connection 26 with the rocker box. The housing 22 is provided with a rigid head 28 disposed interiorly of the rocker box 24. The head 28 carries a pair of spaced apart laterally extending lugs 30 disposed in parallel relation to one another.

The lugs 30 carry therein a pin 32 on which is fulcrumed a rocker arm 16 on one end of which is supported a roller 34 disposed immediately above the valve tip 19, while the opposite end of the rocker arm is provided with a socket 25 in its lower face.

Screwed into the lower end of the housing 22 is an adjusting sleeve 36 which is suitably secured to the crankcase 27 as indicated at 38.

Confined between the head 28 of the housing 22 and the bottom of the rocker box 24 is a coil spring 29 normally urging the housing upwardly.

The housing 22 has mounted therein for sliding movement a push rod 18 having a ball-shaped head 31 at its upper end received by the socket 25 in the rocker arm 16. The lower end of the push rod 18 is provided with a similarly shaped head 33 contacting with a tappet 20 carried by the crankcase 27. The tappet 20 is engaged by a suitable cam, not shown.

The operation of the device is as follows:

As can be readily understood from the above description, the valve 14 is opened by the actuation of the rocker arm 16 through the push rod 18 and the cam operated tappet 20.

The temperature of the exposed push rod housing and the contained push rod 18 is subject to little variation whereas the cylinder expands axially by a considerable amount due to the relatively large temperature range in operation. The distance from the fulcrum pin 32 to the cam which actuates the tappet 20 thus remains substantially constant whereas the valve tip approaches the rocker arm roller 34 as the cylinder warms up, thus giving maximum clearance at idling temperatures and minimum clearance at full power temperatures, whereby zero overlap at idling may be combined with a substantial overlap at full throttle, conformably with the objects previously set forth.

The length of the housing 22 may be varied by screwing or unscrewing the adjusting sleeve 36, whereby the distance between the fulcrum pin 32 and the crankcase 27 may be varied to meet different conditions, and whereby correct adjustment of the valve mechanism clearance may be effected.

It is to be understood that the above described embodiment of the invention is for the purpose of illustration only, and various changes may be made therein without departing from the spirit and scope of the invention.

I claim as my invention:

1. In an engine having a valve actuating rocker arm within a closed housing, a housing for a cam, a cam actuated push rod operating said rocker arm a tubular member surrounding the push rod anchored to said cam housing and having a head slidable within the rocker arm housing, and fulcrum means for the rocker arm carried by said head.

2. In an engine cylinder, means for giving minimum valve gear clearance at maximum operating temperatures including a valve actuating rocker arm, a rocker box, a fulcrum for the rocker arm wholly independent of the rocker box, and means to anchor said fulcrum within the rocker box and to the engine independently of the expansion of the cylinder.

3. In a rocker arm valve actuating mechanism for an engine having cylinders subject to expansion, means for obtaining minimum valve clearance at maximum expansion comprising, a rocker box, and a rocker arm fulcrum support secured adjacent the base of the cylinder and slidable within said rocker box relative to the head of the cylinder.

4. The combination with a cylinder and a valve of a rocker arm adapted to actuate said valve, a housing enclosing said rocker arm and fixed to said cylinder, a push rod operatively engaging the rocker arm, and a push rod housing to which said rocker arm is pivoted and which is movable in operation with respect to said rocker arm housing being secured to the engine adjacent the base of the cylinder.

5. In an engine having a rocker arm valve actuating mechanism, a casing, a rocker box enclosing said rocker arm and having formed therein an opening, and a push rod housing anchored to said casing, slidably engaging in said rocker box opening and having formed thereon within said rocker box a fulcrum for said rocker arm.

6. In an engine having a rocker arm valve actuating mechanism, a casing, a rocker box enclosing said rocker arm and having formed therein an opening, a push rod housing anchored to said casing, slidably engaging in said rocker box opening and having formed thereon within said rocker box a fulcrum for said rocker arm, and means on said push rod housing for adjusting the length thereof to change the position of said fulcrum with respect to said rocker box.

7. In a rocker arm valve actuating mechanism for an engine cylinder, in combination, a rocker box on said cylinder having an opening, a push rod housing slidably engaging within said opening and having thereon, within said rocker box, a rocker arm fulcrum whereby the rocker arm is pivotally held by said push rod housing, means for adjusting the length of said push rod housing, and means for resiliently sealing said housing at the region of engagement thereof with said rocker box.

RUDOLPH DAUB.